(12) United States Patent
Yamada (10) Patent No.: US 7,840,326 B1
(45) Date of Patent: Nov. 23, 2010

(54) VEHICLE CONTROL SYSTEM AND METHOD USING NAVIGATION DATA

(75) Inventor: Kazunao Yamada, Anjo (JP)

(73) Assignee: Denso Corporation, Kariya (JP)

( * ) Notice: Subject to any disclaimer, the term of this patent is extended or adjusted under 35 U.S.C. 154(b) by 1023 days.

(21) Appl. No.: 11/519,011

(22) Filed: Sep. 12, 2006

(30) Foreign Application Priority Data

Oct. 12, 2005 (JP) ............................. 2005-297671

(51) Int. Cl.
*B60Q 1/08* (2006.01)
*G01C 21/30* (2006.01)

(52) U.S. Cl. ........................................ 701/49; 701/216
(58) Field of Classification Search ................... 701/36, 701/49, 200–221; 362/37–60
See application file for complete search history.

(56) References Cited

U.S. PATENT DOCUMENTS

| | | | | |
|---|---|---|---|---|
| 5,588,733 | A * | 12/1996 | Gotou | 362/37 |
| 5,793,310 | A * | 8/1998 | Watanabe et al. | 340/995.14 |
| 5,848,374 | A * | 12/1998 | Wakabayashi et al. | 701/212 |
| 5,961,571 | A * | 10/1999 | Gorr et al. | 701/207 |
| 6,047,234 | A * | 4/2000 | Cherveny et al. | 701/200 |
| 6,049,749 | A * | 4/2000 | Kobayashi | 701/49 |
| 6,343,869 | B1 * | 2/2002 | Kobayashi | 362/37 |
| 6,459,387 | B1 * | 10/2002 | Kobayashi et al. | 340/988 |
| 7,425,085 | B2 * | 9/2008 | Mizuno et al. | 362/465 |
| 2002/0036907 | A1 * | 3/2002 | Kobayashi et al. | 362/464 |
| 2002/0039295 | A1 | 4/2002 | Kobayashi et al. | |
| 2002/0080617 | A1 * | 6/2002 | Niwa et al. | 362/465 |
| 2002/0080618 | A1 * | 6/2002 | Kobayashi et al. | 362/466 |
| 2004/0085201 | A1 * | 5/2004 | Dubrovin et al. | 340/458 |
| 2005/0027419 | A1 | 2/2005 | Horii et al. | |

FOREIGN PATENT DOCUMENTS

| | | |
|---|---|---|
| DE | 197 42 414 | 4/1999 |
| DE | 101 49 285 | 4/2003 |
| DE | 102 26 143 | 1/2004 |
| JP | A-09-068567 | 3/1997 |

(Continued)

OTHER PUBLICATIONS

Office Action mailed Apr. 6, 2010 from Japan Patent Office in corresponding JP application No. 2005-297671 (and English translation).

(Continued)

*Primary Examiner*—Mark Hellner
*Assistant Examiner*—Ari M Diacou
(74) *Attorney, Agent, or Firm*—Posz Law Group, PLC (57) ABSTRACT

While a vehicle travels in a regular point, an absolute position of the vehicle is detected based on detection signals of a GPS sensor, a gyro sensor and a vehicle speed sensor. Then, a map matching process is performed such that the detected absolute position is corrected to be matched with a road map of map data. While the vehicle travels at a specific point, track position information of the vehicle based on the detected absolute position is stored independently of the map data. In particular, when the track position information regarding the specific point at which the vehicle is traveling at this point has been already stored, the information is sent to a light control unit, whereby the light control unit performs the optical axis control according to the traveling track indicated by the track position information.

4 Claims, 4 Drawing Sheets

FOREIGN PATENT DOCUMENTS

| | | |
|---|---|---|
| JP | A-11-328592 | 11/1999 |
| JP | A-2002-052976 | 2/2002 |
| JP | A-2005-084024 | 3/2005 |
| JP | A-2005-132291 | 5/2005 |

OTHER PUBLICATIONS

Office Action dated Oct. 26, 2007 in a corresponding German Patent Application No. 10 2006 048 398.7 (and English translation).

* cited by examiner

VEHICLE CONTROL SYSTEM AND METHOD USING NAVIGATION DATA

CROSS REFERENCE TO RELATED APPLICATION

This application is based on and incorporates herein by reference Japanese Patent Application No. 2005-297671 filed on Oct. 12, 2005.

FIELD OF THE INVENTION

This invention relates to vehicle control system and method, which perform a vehicle control according to road conditions.

BACKGROUND OF THE INVENTION

Conventionally, a vehicle navigation system uses both absolute positioning data obtained by a satellite navigation technique using a GPS sensor and relative positioning data obtained by a dead reckoning navigation technique using a gyro sensor, a vehicle speed sensor and the like, to detect an absolute position of a vehicle. The vehicle navigation system displays the current position of the vehicle on a road map indicated based on map data. However, due to, for example, an error between a road on the road map indicated based on the map data and an actual road, the detected absolute position often does not conform to the road map indicated based on the map data.

To avoid this, the processing of correcting the position of the vehicle to match it with a road map indicated based on the map data (map matching process) is performed to find the vehicle position relative to the road map indicated based on the map data. Thus, in the navigation system emphasis is placed on matching a vehicle position with a road map. Therefore, even in a place where a road map indicated based on the map data differs from an actual road, the navigation system is required to display the vehicle position matched with the road map.

On the other hand, the navigation system for vehicle control according to road conditions is used more often recently. For example, US 2005/0027419A1 (JP 2005-59839A) discloses a control system, which adjusts the direction of the optical axes of a pair of right and left headlights mounted on the front end of a vehicle in a horizontal plane with respect to the surface of a road. Thus, the optical axes of the headlights are adjusted in direction according to road conditions, which are determined from a road map indicated based on map data (in a road direction in front of the vehicle). In this regard, the adjustment of the optical axis direction of the headlights according to the road conditions, which are determined based on the road map, involves an inappropriate control relative to the actual road conditions in a place where the accuracy of the road map indicated based on the map data is low, such as mountain paths. For this reason, the optical axis of only one of the pair of right and left headlights is adjusted in direction according to the road conditions, which are determined from the road map indicated based on the map data.

With such a technique of controlling the direction of the optical axis of only one of the headlights in accordance with the road conditions determined from the road map indicated based on the map data, the control deterioration occurring in a place where the accuracy of the road map indicated based on the map data is low (the control results deviate from the actual road conditions) can be reduced by half. However, the control effects in a place where a high accuracy of the road map indicated based on the map data is obtained are also reduced by half.

SUMMARY OF THE INVENTION

It is an object of the present invention to achieve effective vehicle control according to road conditions.

To attain this object, vehicle control system and method detect an absolute position of a vehicle. The vehicle control system stores the absolute positions of the vehicle while the vehicle travels as vehicle traveling track information, and performs vehicle control in accordance with road conditions determined from the traveling track information. The vehicle control here means control over devices of the vehicle, including control of adjusting the direction of the optical axis of a headlight in accordance with a road direction in front of the vehicle, for example.

In a vehicle control system, by detecting absolute positions of the vehicle with high accuracy, traveling track information with high accuracy is stored. The vehicle is controlled according to road conditions which are determined from the stored traveling track information with high accuracy. In consequence, it is possible to achieve effective vehicle control as compared with the case of vehicle control performed according to road conditions determined based on a road map with a low accuracy.

BRIEF DESCRIPTION OF THE DRAWINGS

Features and advantages of an embodiment will be appreciated, as well as methods of operation and the function of the related parts, from a study of the following detailed description, the appended claims and the drawings, all of which form a part of this application. In the drawings:

DETAILED DESCRIPTION OF EXAMPLE EMBODIMENT

Figure 1:
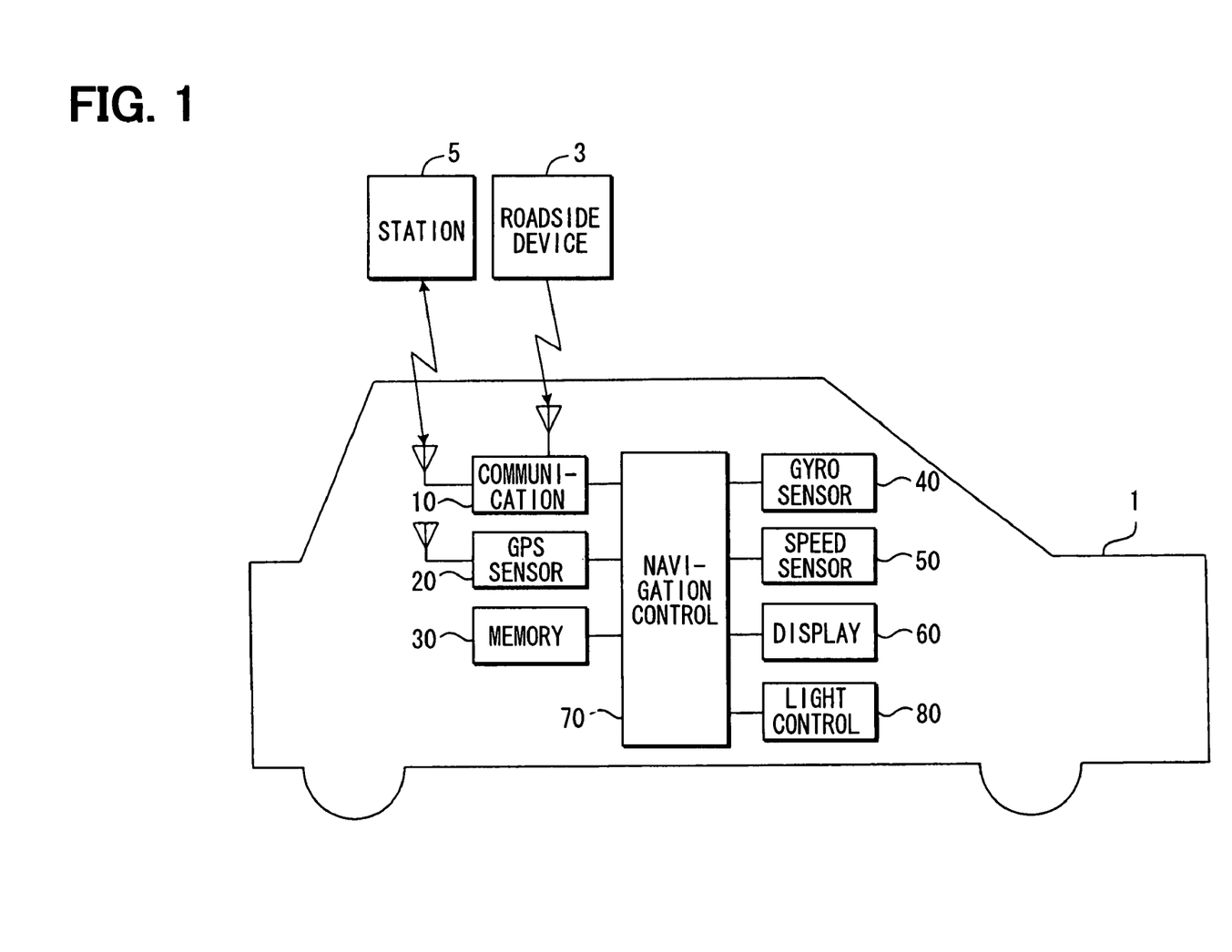
FIG. 1 is a block diagram schematically illustrating a vehicle control system of an exemplary embodiment according to the present invention.

Referring first to FIG. 1, a vehicle control system is mounted on and used in a vehicle (automobile) 1. The vehicle control system is equipped with a communication unit 10, a GPS sensor 20, a memory unit 30, a gyro sensor 40, a vehicle speed sensor 50, a display 60, a navigation control unit 70, and a light control unit 80.

The communication unit 10 has two functions: a function of receiving information through a wireless personal area network from roadside devices 3 that are provided along roadsides; a function of carrying out communications through a communication network, such as the Internet, with a central station 5 (corresponding to an external server) which collects information from a plurality of vehicles on which the vehicle control system is mounted. Examples of the processing carried out by the central station 5 are a process of receiving and storing the information transmitted from a plurality of the vehicles, and a process of providing (transmitting) the stored information to the vehicle in response to a request from the vehicle.

The GPS sensor 20 receives a radio wave transmitted from an artificial satellite for GPS (Global Positioning System), and detects an absolute position (latitude, longitude, and altitude) of the vehicle 1.

The memory unit 30 includes a hard disk drive (HDD) and stores various types of information. The memory unit 30 stores map data indicating road maps. The memory unit 30 may be a device reading map data from a portable storage medium, e.g., a semiconductor memory, magneto-optical disk, magnetic disk such as a flexible disk.

The gyro sensor (angular velocity sensor) 40 outputs a detection signal indicative of an angular velocity of rotational movement applied to the vehicle 1.

The vehicle speed sensor 50 outputs pulse signals at intervals according to the traveling speed of the vehicle 1.

The display 60 is a liquid crystal display, for example, and provided for displaying various types of information such as a road map indicated based on the map data.

The navigation control unit 70 is constituted mainly of a microcomputer including a CPU, a ROM, a RAM, an I/O, a bus line connecting them and the like. The navigation control unit 70 has control over the foregoing components. Examples of processing performed by the navigation control unit 70 are: the process of detecting an absolute position of the vehicle 1 based on the detection signals sent from the GPS sensor 20, the gyro sensor 40 and the vehicle speed sensor 50; a map-matching process of correcting a position of the vehicle 1 such that the position matches a road map indicated based on the map data stored in the memory unit 30; a process of displaying the road map indicated based on the map data and the position of the vehicle 1 subjected to the map-matching process on the display 60; and a process of retrieving an optimum traveling route from the current position of the vehicle 1 to a destination and guiding the user to the destination.

Figure 2A:
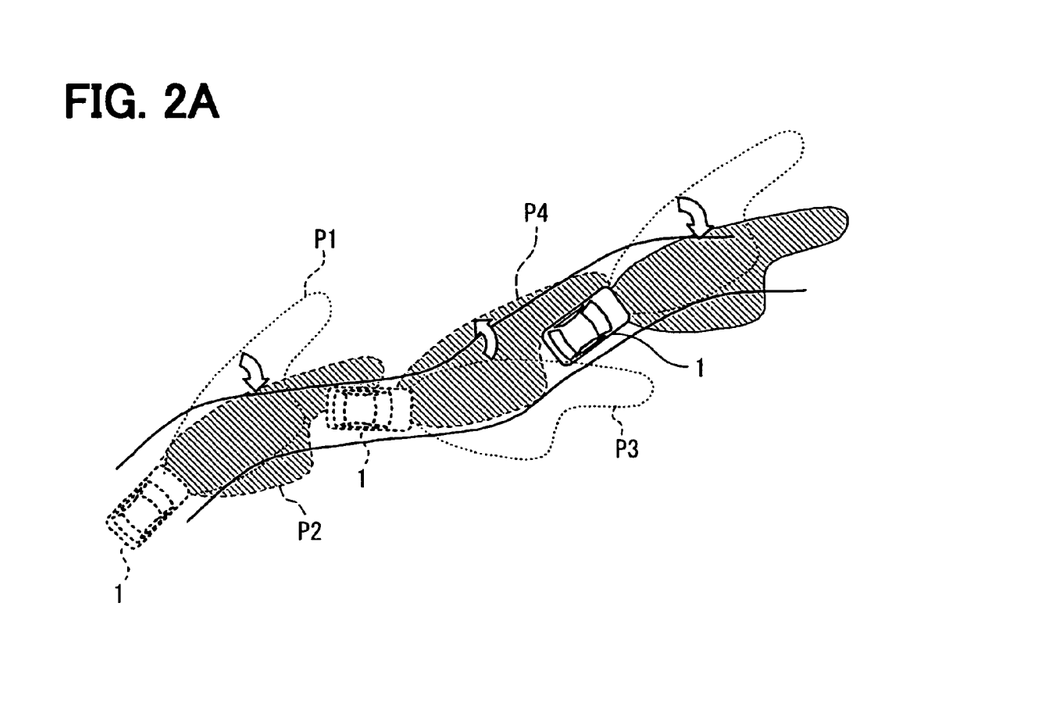
FIGS. 2A to 2C are diagrams illustrating optical-axis control performed by a light control unit in the embodiment.
Figure 2B:
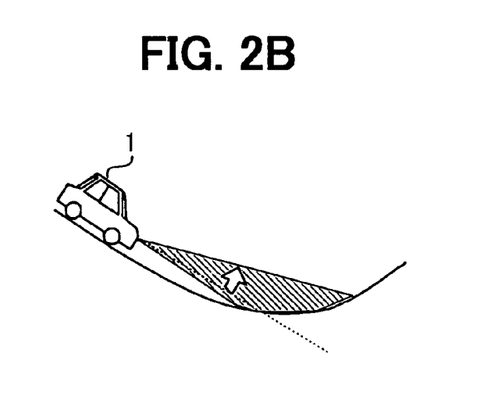
Figure 2C:
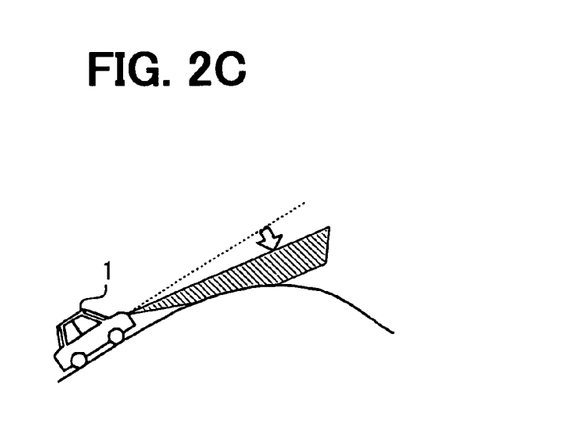

The light control unit 80 is constituted mainly of a microcomputer including a CPU, a ROM, a RAM, an I/O, a bus line connecting them and the like. The light control unit 80 is communicatively connected to the navigation control unit 70 through a communication line. Based on the information sent from the navigation control unit 70, the light control unit 80 controls headlights mounted on the right and left sides of the front end of the vehicle 1 to change the direction of the optical axes of the headlights (the optical-axis control) as shown in FIGS. 2A to 2C. Specifically, road conditions (in a road direction in front of the vehicle 1) are determined from the information (on traveling track) sent from the navigation control unit 70. Thus, depending on the road conditions, the optical axis direction is adjusted to be rightward from a light distribution pattern P1 to a light distribution pattern P2 as shown in FIG. 2A, when the road in front of the vehicle 1 makes a curve to the right. When the road in front of the vehicle 1 makes a curve to the left, the optical axis direction is adjusted to be leftward from a light distribution pattern P3 to a light distribution pattern P4 as shown in FIG. 2A. When the road in front of the vehicle 1 slopes upward, the optical axis direction is adjusted to be upward as shown in FIG. 2B. When the road in front of the vehicle 1 slopes downward, the optical axis direction is adjusted to be downward as shown in FIG. 2C.

The light control unit 80 performs the control according to the degree of reliability of the information sent from the navigation control unit 70. Specifically, when the degree of reliability of the information is high, the optical axis direction is adjusted in accordance with the conditions of the road ahead of the vehicle 1 which are determined from the information sent from the navigation control unit 70. On the other hand, as the degree of reliability of the information is lower, the amount of adjustment (an angle of adjustment) of the optical axis direction is reduced. For example, when the degree of reliability is moderate, the amount of adjustment of the optical axis direction is held down at a level of 70% of the amount of adjustment when the degree of reliability is high. When the degree of reliability is low, the amount of adjustment of the optical axis direction is held down at a level of 40% of the amount of adjustment when the degree of reliability is high. In this way, control deterioration taking place when a large error occurs between the actual road conditions and the road conditions determined based on the information sent from the navigation control unit 70 is reduced.

The control system changes the amount of adjustment of the headlights as an example of vehicle control according to the degree of reliability of the information sent from the navigation control unit 70. However, a variety of possible control methods may be employed for the vehicle control according to the degree of reliability. For example, the right and left headlights can be adjusted when the degree of reliability is high, and one of the headlights can be adjusted according to the degree of reliability. Alternatively, feasible items of the vehicle control may be changed with the degree of reliability. For example, when the degree of reliability is high, the braking force can be controlled according to the road conditions in addition to the control on the headlights. When the degree of reliability is middle, the control on the headlights alone can be carried out. Then, when the degree of reliability is low, the vehicle control according to the road conditions cannot be performed.

Figure 3:
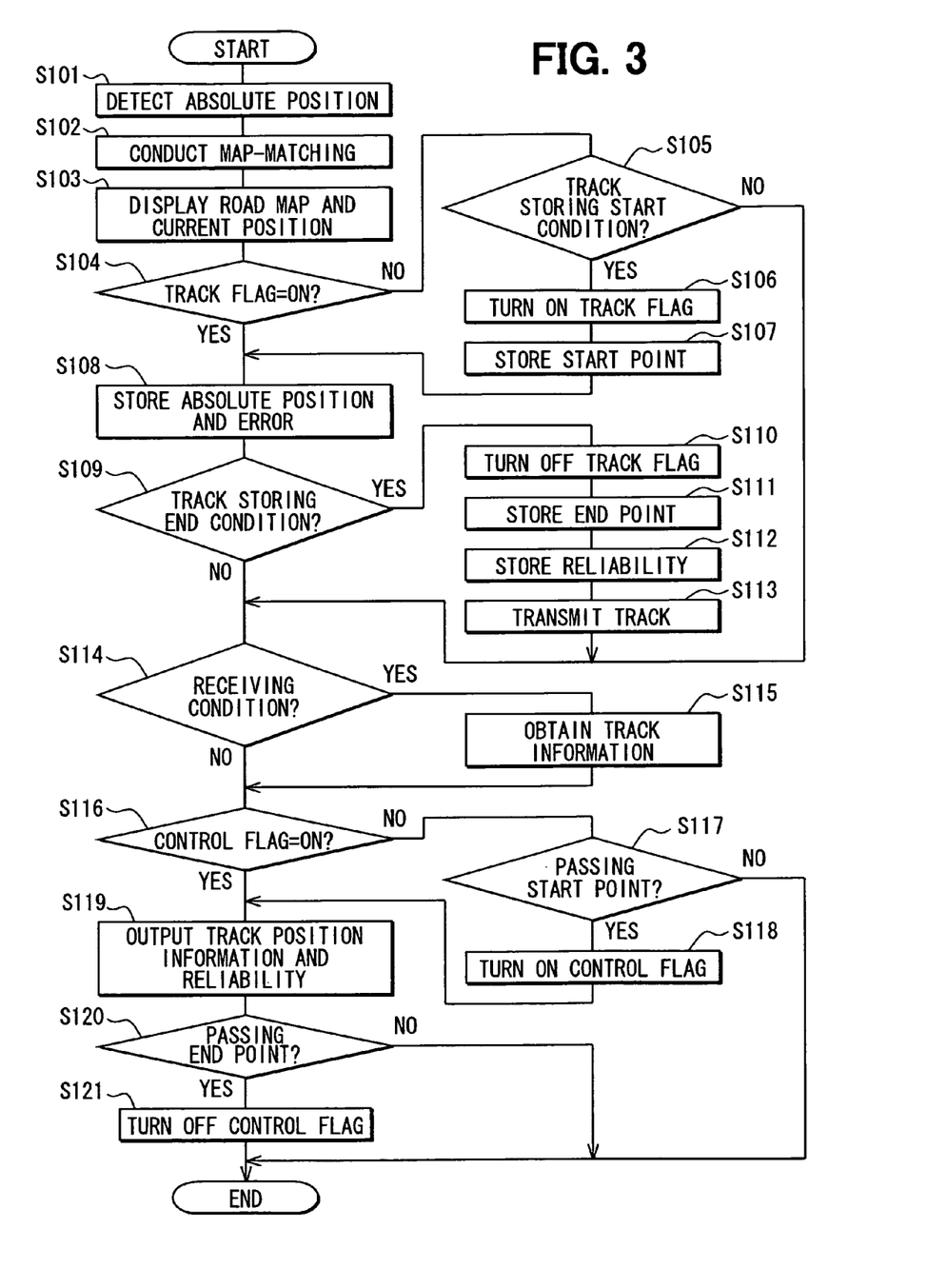
FIG. 3 is a flowchart for a process of detecting a position used for vehicle control in the embodiment.

The navigation control unit 70 may be programmed to perform the processing for position detection for the vehicle control as shown in FIG. 3. The position detection process for this vehicle control is executed at regular intervals (e.g., every 200 ms).

Upon start of the position detection process for the vehicle control, at S101 the navigation control unit 70 detects an absolute position of the vehicle 1 at this point in time. Specifically, the navigation control unit 70 uses together the absolute positioning data and the relative positioning data to detect an absolute position of the vehicle 1. In this case, the absolute positioning data is obtained on the basis of a detection signal sent from the GPS sensor 20 by a satellite navigation technique. The relative positioning data is obtained on the basis of detection signals sent from the gyro sensor 40 and the vehicle speed sensor 50 by a dead reckoning navigation technique. If the GPS sensor 20 cannot detect an absolute position because, for example, it cannot receive a radio wave transmitted from artificial satellites, the navigation control unit 70 attempts to use the roadside devices 3 to detect an absolute position. Specifically, when the vehicle 1 is near the roadside device 3, the navigation control unit 70 operates the communication unit 10 to communicate with the roadside device 3 to retrieve information about the absolute position stored in the roadside device 3 (a latitude, a longitude, and an altitude at which the roadside device 3 is located).

Then, at S102 the navigation control unit 70 corrects the absolute position of the vehicle 1 which is detected at S101 to match it with a road map indicated based on the map data stored in the memory unit 30, thereby to conduct the map-matching process of obtaining the position of the vehicle 1 with reference to the road map indicated based on the map data.

Then, at S103 the navigation control unit 70 operates the display 60 to display the road map indicated based on the map data and the current position of the vehicle 1 on the basis of the position of the vehicle 1 subjected to the map-matching process.

Next, the navigation control unit 70 determines at S104 whether or not a track storing flag (track flag) is ON. The track storing flag indicates whether or not a state that requires a traveling track of the vehicle 1 to be stored arises. Specifically, when the state that requires a traveling track of the vehicle 1 to be stored arises, the navigation control unit 70 sets the track storing flag at S106 as described later. When the state that requires a traveling track of the vehicle 1 to be stored is eliminated, the navigation control unit 70 clears the track storing flag at S110 as described later. The navigation control unit 70 stores the ON/OFF of the track storing flag in the RAM, and holds it until the engine of the vehicle 1 is stopped.

If the determination at S104 is made that the track storing flag is not ON, the process proceeds to S105 where the navigation control unit 70 determines whether or not a necessary condition for starting to store a traveling track of the vehicle 1 is met, that is, whether or not the state that requires a traveling track of the vehicle 1 to be stored arise. Specifically, when the following condition (A) or (B) is met, and the following condition (C) or (D) is met, the navigation control unit 70 determines that the start condition is met.

(A) The amount of correction made during the map-matching process at S102 exceeds a predetermined value of a start criterion, that is, the error between an actual road and a road map indicated based on the map data is expected in a high level.

(B) The position of the vehicle 1 after the map-matching process at S102 (the position of the vehicle 1 with reference to the road map indicated based on the map data) is within a predetermined specific area. The "specific area" means an area that is in great need to increase the high accuracy of the control of the headlights. The embodiment pre-assigns areas around an accident-prone spot and a dangerous spot to the specific area.

(C) The GPS sensor 20 is under circumstances where it is able to detect an absolute position, or alternatively, the vehicle 1 moves a distance less than a predetermined travel distance from a spot where the GPS sensor 20 is able to detect an absolute position. The predetermined travel distance is here set at a distance which the positioning accuracy in the dead reckoning navigation system is maintained.

(D) The vehicle 1 is under circumstances where information on an absolute position is able to be obtained from the roadside device 3, or alternatively, the vehicle 1 moves a distance less than a predetermined travel distance from a spot where information on an absolute position is obtained from the roadside device 3. The predetermined travel distance is here set at a distance which the positioning accuracy in the dead reckoning navigation system is maintained.

Next, if the navigation control unit 70 determines at S105 that a necessary condition for starting to store a traveling track of the vehicle 1 is met, the process proceeds to S106 where the track storing flag is set or turned on.

Then, at S107 the navigation control unit 70 operates the memory unit 30 to store the current position of the vehicle 1 with reference to the road map as a track start point representing a start point for a traveling track. Then, the process proceeds to S108.

On the other hand, if the navigation control unit 70 determines at S104 that the track storing flag is ON, the process proceeds directly to S108.

At S108, the navigation control unit 70 operates the memory unit 30 to store the absolute position detected at S101 and an error estimated by the GPS sensor 20 as track position information. Specifically, to store the absolute position and the estimated error, the memory unit 30 links them to the latest track start point already stored in the memory unit 30 (the track start point most recently stored therein). In this case, an error estimated by the GPS sensor 20 is a value indicative of an accuracy of an absolute position of the vehicle 1 detected by the GPS.

Various possible methods can be used to determine this value. In the embodiment, a level of the estimated error is determined by an evaluation method in which, based on the number of artificial satellites transmitting radio waves which are received by the GPS sensor 20, the larger the number of artificial satellites, the lower the estimated error becomes. Specifically, when the GPS sensor 20 receives the radio waves from the three artificial satellites, a level of the estimated error is "high". When receiving the radio waves from the four artificial satellites, a level of the estimated error is "middle". When receiving the radio waves from the five or more artificial satellites, a level of the estimated error is "low". In evaluation, the estimated error is a lower level in the case of the four artificial satellites than the five or more artificial satellites is. This is because, as the number of artificial satellites increases, a combination with a higher accuracy can be selected.

At S108, if track information regarding the same traveling path has been already stored, the navigation control unit 70 updates absolute positions according to the level of the error estimated by the GPS sensor 20. When the level of the estimated error already stored is higher, the absolute position may be updated. When the level of the estimated error already stored is lower, the absolute position may not be updated. When the level of the estimated error already stored is equal to that newly stored, the absolute position may be updated or may not be updated. In this case, if a mean value between an already stored absolute value and a newly stored absolute value is obtained. This mean value is used to implement an update, the stored absolute value information can be more and more accurate.

Then, at S109, the navigation control unit 70 determines whether or not a necessary condition for terminating to store the traveling track of the vehicle 1 is met, that is, whether or not the state that requires a traveling track of the vehicle 1 to be stored is eliminated. Specifically, when the following conditions (E) and (F) are met, or alternatively the following conditions (G) and (H) are met, the navigation control unit 70 determines that the ending or terminating condition is met.

(E) The amount of correction made during the map-matching process in S102 is below a predetermined value of a terminating criterion, that is, the error between an actual road and a road map indicated based on the map data is expected in a low level.

(F) The position of the vehicle 1 after the map-matching process at S102 (the position of the vehicle 1 with reference to the road map indicated based on the map data) is out of a predetermined specific area as described in the condition (B).

(G) The GPS sensor 20 is not under circumstances where it is able to detect an absolute position, and the vehicle 1 moves a distance greater than a predetermined travel distance from a spot where the GPS sensor 20 is able to detect an absolute position as described in the condition (C).

(H) The vehicle 1 is not under circumstances where information on an absolute position is able to be obtained from the roadside device 3, and the vehicle 1 moves a distance greater than a predetermined travel distance from a spot where information on an absolute position is obtained from the roadside device 3 as described in the condition (D).

Next, at S111, the navigation control unit 70 operates the memory unit 30 to store the current position of the vehicle 1 with reference to the road map as a track end point indicative of an endpoint of the traveling track. Specifically, to store the track end point, the memory unit 30 links it to the latest track start point already stored in the memory unit 30 (the track start point most recently stored therein).

Then, at S112, the navigation control unit 70 operates the memory unit 30 to store the degree of reliability of the track position information. Specifically, as in the case of the track end point, the memory unit 30 links the degree of reliability to the latest track start point already stored therein. At this point, the degree of reliability is determined on the basis of the track position information linked to the track start point and stored in the memory unit 30. Specifically, when the track position information includes one estimated error of the "high" level, a level of the reliability is "low". When the track position information does not include an estimated error of the "high" level but includes one estimated error of the "middle" level, a level of the reliability is "middle". When the track position information does not include any estimated error of the "high" and "middle" levels (includes only an estimated error of the "low" level), a level of the reliability is "high." A "high" level of the reliability corresponds to a degree of accuracy less than ±5 m. A "middle" level of the reliability corresponds to a degree of accuracy more than ±5 m less than ±10 m. A "low" level of the reliability corresponds to a degree of accuracy greater than ±10 m.

Next, at S113, the navigation control unit 70 transmits the information about the traveling track stored in the memory unit 30 (the track start point, the track position information, the track end point and the degree of reliability) from the communication unit 10 to the central station 5. Then, the process proceeds to S114. By transmitting information about the traveling track to the central station 5 in this manner, the central station 5 collects information from a plurality of vehicles 1.

At S109, on the other hand, if the navigation control unit 70 determines that a necessary condition for ending of storing the traveling track of the vehicle 1 is not met, the process proceeds directly to S114.

Also, if the navigation control unit 70 determines as S105 that a necessary condition for starting to store the traveling track of the vehicle 1 is not met, the process moves directly to S114.

At S114, the navigation control unit 70 determines whether it is time point of receiving information regarding a traveling track from the central station 5. Regarding the time point of receiving information regarding a travel track from the central station 5, the time point at which the information is frequently received is desirable from the viewpoint of obtaining the latest information, but the time point at which the information is less frequently received is desirable from the view point of reducing unnecessary communications. Examples of possible time point are time point at a preprogrammed time, time point after a lapse of a predetermined time from the previous reception, time point when the vehicle passes through a predetermined point on the load map, time point when the vehicle travels a predetermined distance from the point where the last information has been received, time point when the vehicle is located at a predetermined distance away from the point where the last information has been received, and time point every time the engine of the vehicle is started.

If the navigation control unit 70 determines at S114 that the time point of receiving information regarding a traveling track from the central station 5 comes, the process proceeds to S115 where the communication unit 10 communicates with the central station 5 to obtain the information regarding the traveling track stored in the central station 5 (the track start point, the track position information, the track end point and the degree of reliability). Then, the navigation control unit 70 stores the obtained information in the memory unit 30. By transmitting the current position of the vehicle 1 to the central station 5, if the navigation control unit 70 can obtain only information regarding an area in the vicinity of the current position (e.g., an area within a radius of 10 km of the current position), a reduction in time required for communication and a reduction in memory capacity of the memory unit 30 are achieved.

Next, at S116, the navigation control unit 70 determines whether or not a vehicle control flag is ON. A vehicle control flag indicates whether or not a state that requires the light control unit 80 to perform the optical axis control arises. Specifically, when the state that requires the light control unit 80 to perform the optical axis control arises, the navigation control unit 70 sets the vehicle control flag at S118 as described later. When the state that requires the light control unit 80 to perform the optical axis control is eliminated, the navigation control unit 70 clears the vehicle control flag at S121 as described later. The navigation control unit 70 stores the ON/OFF of the vehicle control flag in RAM, and holds it until the engine of the vehicle 1 is stopped.

If the determination at S116 is made that the vehicle control flag is not ON (OFF), the process proceeds to S117 where the navigation control unit 70 determines whether or not the vehicle 1 passes through the track start point stored in the memory unit 30, that is, whether or not the state that requires execution of the optical axis control arises. Specifically, the determination is made based on the position of the vehicle 1 subjected to the map matching process at S102 (the position of the vehicle 1 with reference to the road map indicated based on the map data). Accordingly, if the determination is made that the vehicle 1 travels through the track start point stored in the memory unit 30 (any track start point if a plurality of track start points are stored) and enters the traveling track indicated by the track position information stored together with the track start point linked thereto, the navigation control unit 70 determines that the vehicle 1 passes through the track start point.

If the navigation control unit 70 determines at S117 that the vehicle 1 does not travel through the track start point stored in the storage 30, it ends the position detection process for the vehicle control.

At S117, on the other hand, if navigation control unit 70 determines that the vehicle 1 travels through the track start point stored in the storage 30, the process proceeds to S118 where the vehicle control flag is set. Then, the process proceeds to S119.

At S116, on the other hand, if the navigation control unit 70 determines that the vehicle control flag is ON, the process moves directly to S119.

At S119, the navigation control unit 70 outputs to the light control unit 80 the track position information stored together with and linked to the track start point through which the vehicle 1 has passed, and the reliability of the track position information. Specifically, the navigation control unit 70 uses data from the center 5 if the determination at S114 is YES, but data of S108 if the determination at S114 is NO. Thus, the navigation control unit 70 supplies items of the track position information which are necessary to perform the optical axis control at the current time (information regarding traveling track ahead of the vehicle 1). As a result, the light control unit 80 performs the optical axis control according to the traveling track.

Then, at S120, the navigation control unit 70 determines whether or not the vehicle 1 travels through the track end point stored in the memory unit 30, that is, whether or not the state that requires execution of the optical axis control is eliminated. Specifically, the determination is based on the position of the vehicle 1 subjected to the map matching process at S102 (the position of the vehicle 1 with reference to the road map indicated based on the map data). Accordingly, if it is determined that the vehicle 1 travels through the track end point stored in the memory unit 30 (a track end point stored together with and linked to the last track start point through which the vehicle has passed), the navigation control unit 70 determines that the vehicle 1 passes through the track end point.

If the navigation control unit 70 determines at S120 that the vehicle 1 does not travel through the track end point stored in the storage 30, it terminates the position detection process for the vehicle control.

At S120, on the other hand, if navigation control unit 70 determines that the vehicle 1 travels through the track end point stored in the storage 30, the process proceeds to S121 where the vehicle control flag is turned off or cleared. Then, the position detection process for the vehicle control is terminated.

Figure 4:
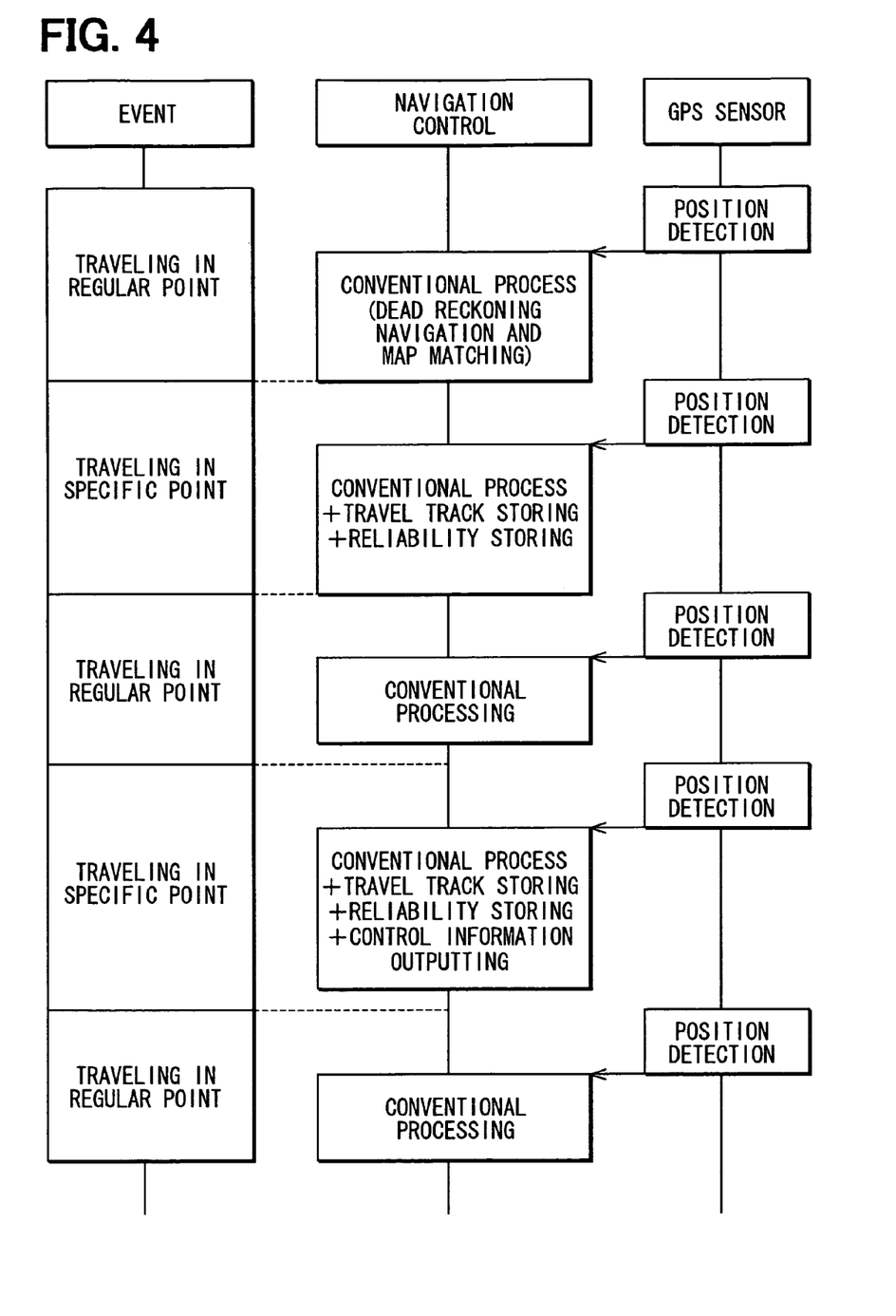
FIG. 4 is a time chart showing the general outline of processing in the embodiment.

Next, the processing realized by the vehicle control system will be described with reference to the time chart in FIG. 4. In FIG. 4, a regular point means a travel area in which the traveling track of the vehicle 1 need not be stored. A specific point means a travel area in which the traveling track of the vehicle 1 need be stored.

While the vehicle 1 travels in the regular point, the navigation control unit 70 executes similar processing to that in the conventional navigation systems. That is, the navigation control unit 70 uses together the absolute positioning data and the relative positioning data to detect an absolute position of the vehicle 1 (S101). The absolute positioning data is obtained on the basis of a detection signal sent from the GPS sensor 20 by a satellite navigation technique. The relative positioning data is obtained on the basis of detection signals sent from the gyro sensor 40 and the vehicle speed sensor 50 by the dead reckoning navigation technique. Then, the absolute position of the vehicle 1 is corrected to be matched with the road map indicated based on the map data stored in the memory unit 30, thus executing the map-matching process of obtaining the position of the vehicle 1 with reference to the road map indicated based on the map data (S102).

On the other hand, while the vehicle 1 travels at the specific point, the navigation control unit 70 performs the same processes as those executed when the vehicle 1 travels in the regular point. In addition, the navigation control unit 70 performs a process of storing the track position information of the vehicle 1 based on the absolute position, as well as the map data (S108). When the vehicle 1 moves from the specific point to the regular point, the degree of reliability of the stored track position information is stored (S112). In particular, when the track position information regarding the specific point at which the vehicle 1 is traveling at this point has been already stored, the track position information and the reliability are supplied to the light control unit 80. As a result, the light control unit 80 performs the optical axis control according to the traveling track.

As described above, the vehicle control system stores, as the track position information, an absolute position of the vehicle 1 which is detected while it travels, and performs the optical axis control according to road conditions determined from the track position information. Accordingly, in the vehicle control system designed as above, the absolute position of the vehicle 1 is detected with high accuracy, so that the track position information with high accuracy is stored. The vehicle is controlled according to the road conditions determined from the stored track position information with high accuracy, thereby realizing an effective vehicle control as compared with vehicle control according to road conditions determined from a road map with low accuracy.

In the vehicle control system, the track position information to be stored is linked to the position of the vehicle 1 with reference to the road map. This makes it possible to simply and correctly determine the presence/absence of the track position information according to the road on which the vehicle 1 travels at this point.

Further, in the vehicle control system, the track position information is stored only when absolute position information with high accuracy is able to be obtained while the vehicle 1 travels on an actual road which is very much different from a road map indicated based on the map data (an area in which the accuracy of the road map indicated based on the map data is low) or while the vehicle 1 travels in a specific area in which the vehicle control is greatly necessary, such as an accident-prone spot and a dangerous spot. In consequence, it is possible to prevent the track position information from being stored when the accuracy of the obtained track position information is essentially lower than that of the road map indicated based on the map data.

In the vehicle control system, the reliability of the track position information is determined on the basis of an error estimated by the GPS, and according to the reliability the optical axis control is performed. As a result, it is possible to effectively produce the control effect in an area where the reliability is high, while reducing the deterioration of the control performance in an area where the reliability is low.

The vehicle control system receives the information regarding the traveling track from the central station 5. This makes it possible to realize effective vehicle control even when the vehicle travels on a road for the first time.

In the vehicle control system of the embodiment, the communication unit 10 operates as communication means. The light control unit 80 operates as vehicle control means. The GPS sensor 20, gyro sensor 40, the vehicle speed sensor 50 and the navigation control unit 70 executing the process at S101 of the position detection processing for the vehicle control operates as absolute position detection means. The memory unit 30 and the navigation control unit 70 executing the processes at S107, S108, S111 and S112 operate as track storing means. The memory unit 30 also operates as map-data storing means. The navigation control unit 70 performing the process in S102 operates as position-on-map determination means. The navigation control unit 70 performing the process at S113 operates as track transmission means. Also, the navigation control unit 70 performing the process at S115 operates as track retrieving means.

The above embodiment may be modified in many other ways.

For example, although the optical axis control is performed only when the vehicle travels on a road which the traveling track is stored, it may be performed on the basis of a road map indicated based on the map data when the vehicle travels on a road which the traveling track is not stored.

Although the information regarding the traveling track stored in the central station 5 is obtained through radio communications from the central station 5, the vehicle control system may receive the information by means of wire communications or a portable storage medium by use of a dealer or the like. In this way, it is possible to obtain a vast amount of information in a short time.

The vehicle control system may not communicate with the central station 5 (not perform the processes S113 to S115). In this structure, the effective optical control can be also realized when the vehicle 1 travels on the road on which the vehicle 1 has traveled at least one time before.

The navigation apparatus may be provided separately from the vehicle control system. The vehicle control system may use the functions of the navigation apparatus (the GPS sensor 20, the map data and the like) by communicating with the navigation apparatus.

In the vehicle control system, although the information according to the current position of the vehicle 1 is used by linking the information regarding the traveling route of the vehicle 1 to the road map indicated based on the map data which are stored together, information according to the current position of the vehicle 1 may be used on the basis of an absolute position indicating a traveling route of the vehicle 1. In consequence, the vehicle control system can be structured without use of map data.

What is claimed is:

1. A vehicle control system comprising:
   absolute position detection means that detects an absolute position of a vehicle;
   vehicle control means that performs a vehicle control according to the absolute position of a vehicle and stored road map data;
   track storing means that stores the absolute position of the vehicle currently detected by the absolute position detection means while the vehicle is traveling on a same road, as current traveling track information regarding the vehicle in place of previously stored traveling track information regarding the vehicle,
   wherein the vehicle control means performs the vehicle control according to road conditions determined from the traveling track information previously stored by the track storing means when the vehicle traveled the same road on which the vehicle currently travels;
   map data storing means that stores map data indicating a road map;
   position-on-map determination means that determines, on the basis of the absolute position of the vehicle detected by the absolute position detection means, the position of the vehicle with reference to the road map indicated based on the map data stored in the map-data storing means,
   wherein the track storing means links the traveling track information to the position of the vehicle with reference to the road map determined by the position-on-map determination means and stores the traveling track information; and
   determination means that determines, on the basis of the position of the vehicle with reference to the road map determined from the position-on-map determination means, whether a state that requires a traveling track of the vehicle to be stored arises,
   wherein the track storing means stores the traveling track information when the determination means determines that the state that requires a traveling track of the vehicle to be stored arises, and
   wherein the determination means determines that the state that requires the traveling track of the vehicle to be stored arises, when the position of the vehicle with reference to the road map determined by the position-on-map determination means is located within a predetermined area in the road map.

2. The vehicle control system according to claim 1, wherein:
   the position-on-map determination means corrects the absolute position of the vehicle detected by the absolute position detection means to match the absolute position with the road map indicated based on the map data, thereby determining the position of the vehicle with reference to the road map; and
   the determination means determines that the state that requires the traveling track of the vehicle to be stored arises, when a degree of the correction by the position-on-map determination means exceeds a predetermined value.

3. The vehicle control system according to claim 1, wherein:
   detection accuracy of the absolute position detected by the absolute position detection means is changed according to conditions in which the absolute position of the vehicle is detected;
   the track storing means determines a reliability of the traveling track information on the basis of the detection accuracy, and links the determined reliability to the traveling track information and stores the determined reliability; and
   the vehicle control means performs the vehicle control in accordance with the reliability stored by the track storing means.

4. The vehicle control system according to claim 1, further comprising:
   communication means that communicates with an external server managing traveling track information of a plurality of vehicles;
   track transmission means that uses the communication means to transmits the absolute position of the vehicle, which is detected by the absolute position detection means while the vehicle is traveling, to the external server as the traveling track information of the vehicle; and
   track retrieving means that uses the communication means to retrieve the traveling track information managed by the external server,
   wherein the vehicle control means performs the vehicle control according to the road conditions determined from the traveling track information retrieved by the track retrieving means.

* * * * *